Feb. 6, 1923.

F. C. ROCKWELL.
FILM FOR THE REPRODUCTION OF PICTURES.
FILED JAN. 22, 1920.

1,444,388.

Inventor
Frederick C. Rockwell.
By Arthur Jenkins
Attorney

Patented Feb. 6, 1923.

1,444,388

UNITED STATES PATENT OFFICE.

FREDERICK C. ROCKWELL, OF WEST HARTFORD, CONNECTICUT.

FILM FOR THE REPRODUCTION OF PICTURES.

Application filed January 22, 1920. Serial No. 353,364.

*To all whom it may concern:*

Be it known that I, FREDERICK C. ROCKWELL, a citizen of the United States, and a resident of West Hartford, in the county of Hartford and State of Connecticut, have invented a new and Improved Film for the Reproduction of Pictures, of which the following is a specification.

My invention relates to the class of articles above named, the invention being particularly susceptible of use in a photographic film such as is used in a moving picture camera, and an object of my invention among others, is to provide a film by means of which new and striking effects may be produced in pictures resulting from exposure of the films.

A film embodying my invention and in the construction and use of which the objects herein set out, as well as others may be attained, is illustrated in the accompanying drawings, in which—

Figure 2:
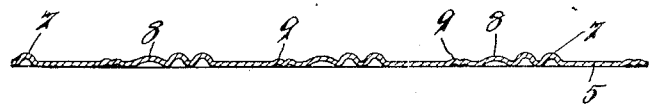
Figure 2 is a view in section through the same on plane denoted by dotted line 2—2 of Figure 1, the thickness of the film being exaggerated in order to clearly illustrate the invention.
Figure 1:
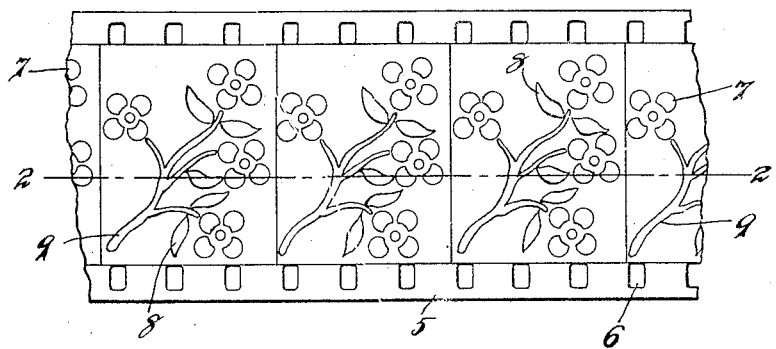
Figure 1 is a plan view of a section of film embodying my invention.

My invention is not limited to any particular kind of film or other device employed to display pictures, but as it is especially adapted for use in connection with films commonly used in moving picture cameras, such a film has been selected by me for illustrating my invention in the drawings herein.

A film or other device, to embody my invention, will be composed of transparent material, devoid of shaded areas. Such film is simply embossed in whole or in part, as may be desired, on the picture section thereof, the embossed parts being formed preferably on curves and without angles the elevated and depressed portions thus formed concentrating and dispersing the light rays, thereby producing lighted areas of different degrees of intensity. A film thus formed will cause the production of a picture having certain portions with extremely high lights and other portions having lights of lesser degrees of intensity. The parts of the film formed in relief on one side will, of course, occur as depressions or in intaglio on the opposite side of the film. It is my purpose to form these reliefs of different heights in order to vary the degree of intensity of the lights in different portions of the pictures produced therefrom, and, of course, the corresponding depths of the intaglioed surfaces will be varied accordingly.

This idea of a film with embossed surfaces is illustrated in the accompanying drawings in which the numeral 5 indicates a film particularly adapted for use in moving picture cameras, and that may be of any desired transparent material, such film having the usual perforations 6 by means of which it is fed. The highest or alto-relievo portions 7 on one side of the picture section of the film denote petals of a conventional form of flower, the next highest or mezzo-relievo portions 8 on said picture section representing a leaf on the vine of said flower, and the still lower or bas-relief portions 9 on the picture section representing the vine itself.

As a result of this formation when one side of the film is exposed for projection purposes the alto-relievo portions will produce the higher lighted parts of the picture the mezzo-relievo portions the areas having the lesser degrees of intensity, and the bas-relief portions areas of light of still lesser degrees of intensity. The picture may be exposed with the side opposite to that above mentioned facing the projecting medium, and the effect will be not only a reversal of the picture but a surprising change in the lighted areas of the picture itself, owing to the different degrees of intensity of the light in different portions. Those parts of the film that before produced the higher lighted areas in the picture now producing the areas having lesser lights, and vice versa.

My invention, therefore, not only contemplates an embossed but a reversible film, that is, a film that may be exposed with either side to the projecting medium, and each side thus exposed will present a picture of entirely different effects from that produced by an exposure of the opposite side, thus in effect producing with the same film two pictures distinctively different in appearance.

My improved embossed film with the raised and depressed portions to bring out the high and lesser lights will be found to produce a picture in which the stereoscopic effects are particularly enhanced, such picture having different degrees of depth therein brought out to a marked degree by the embossed feature of the film.

My improved film is particularly susceptible to the coloring process, by means of which the pictorial effects will be greatly enhanced and such coloring may be applied in a very simple, inexpensive and effective manner.

A color applying implement being passed across such film a certain color will be imparted to the higher portions thereof, and the film being reversed another and different color may be applied to the higher portions of its opposite side, these being the lower portions of that side of the film first treated with color. It will thus be seen that different colors may be readily and quickly applied to the film, resulting in the production of a colored picture having striking and pleasing effects.

In another manner of applying the color the film may be partially embossed and the raised portions thereof, of the lower order, will have the color applied as herein above described to such portions. A succeeding step in the embossing operation may now take place and embossed portions of a greater degree of elevation may be produced to which the colors may be applied, and this process may be continued thereby enabling color in endless variety to be readily applied to the picture. No special color supplied to any of the raised or depressed portions is contemplated herein, as such colors may be applied in any manner to suit the fancy of the artist.

It will, of course, be understood that the raised and depressed portions of the film will be very minute, the drawings representing to an exaggerated extent the embossing, this in order to thoroughly bring out the invention. The embossing may be accomplished in many different ways, as by hand, by a molding process, by a photographic process, or by other means, and I do not limit my invention to any special means of embossing the films.

My improved film provides means whereby the lower lights sometimes employed in silhouettes may be produced in a manner to bring out surprising results as to such lighted portions.

I claim:

1. An embossed film for the reproduction of pictures said embossing being located on the picture section of the film.

2. A film for the reproduction of pictures comprising raised portions on one side of the picture section of the film and corresponding depressions on the opposite side of said section.

3. A film for the reproduction of pictures comprising embossed portions on one side raised to different degrees from the plane of the film.

4. A film for the reproduction of pictures comprising embossed portions raised to different degrees on one side and corresponding depressions of different degrees of depth on the opposite side.

5. A film for the reproduction of pictures comprising raised portions on one side thereof having color applied thereto.

6. A film for the reproduction of pictures comprising raised portions on one side with color applied thereto, and corresponding depressions on the opposite side with a different color applied thereto.

7. A film for the reproduction of pictures comprising a transparent body embossed to provide blunt projected portions on the face of the film for the production of light therethrough.

FREDERICK C. ROCKWELL.